(12) United States Patent  (10) Patent No.: US 6,523,597 B1
Chen  (45) Date of Patent: Feb. 25, 2003

(54) RECOVERY METHOD OF COMPACT DISC

(76) Inventor: Cheng-Shu Chen, No. 17, East First St., Tachia Taichung County (TW)

( * ) Notice: Subject to any disclaimer, the term of this patent is extended or adjusted under 35 U.S.C. 154(b) by 0 days.

(21) Appl. No.: 09/941,635

(22) Filed: Aug. 30, 2001

(51) Int. Cl.$^7$ .............................. B22D 45/00; C25B 1/00
(52) U.S. Cl. ..................... 164/76.1; 164/5; 205/468; 205/480
(58) Field of Search ................... 164/5, 76.1; 205/568, 205/580, 589

(56) References Cited

U.S. PATENT DOCUMENTS 4,828,661 A  * 5/1989  Celi ........................... 205/560
5,151,452 A  * 9/1992  Fennhoff et al. .............. 521/40
5,817,183 A  * 10/1998  Eddy-Helenek et al. ...... 134/19

* cited by examiner

Primary Examiner—Kuang Y. Lin
(74) Attorney, Agent, or Firm—Rosenberg, Klein & Lee

(57) ABSTRACT

A recovery method of a compact disc includes the steps of: crushing a compact disc; b) placing the crushed compact disc into a stripping solution, so that the metallic layer is separated from the plastic base plates of the crushed compact disc; c) filtering the plastic base plates from the stripping solution; d) recovering the metal; and e) recovering the plastic base plates. Thus, the waste compact disc may be recovered and reused, thereby preventing incurring an environmental pollution.

5 Claims, 1 Drawing Sheet

RECOVERY METHOD OF COMPACT DISC

BACKGROUND OF THE INVENTION

1. Field of the Invention

The present invention relates to a recovery method of a compact disc, and more particularly to a recovery method of a compact disc, which may be performed in an environmental protection manner.

2. Description of the Related Art

A compact disc comprises a circular base plate made of plastic material, and a metal layer plated on one side of the base plate. When the compact disc is worn out, it is directly thrown away. However, if the compact disc is directly thrown away, the metal contained in the compact disc will easily cause an environmental pollution. In addition, the metal and the plastic base plate may be recovered and reused. Thus, waste of the compact disc will cause consumption of the resource.

SUMMARY OF THE INVENTION

The primary objective of the present invention is to provide a recovery method of a compact disc, wherein the waste compact disc may be recovered and reused, thereby preventing causing an environmental pollution.

In accordance with the present invention, there is provided a recovery method of a compact disc, comprising the steps of:

a) crushing a compact disc into multiple pieces;

b) placing the multiple pieces of the crushed compact disc into a stripping solution, thereby stripping the multiple pieces of the crushed compact disc, so that a metallic layer of the crushed compact disc is separated from plastic base plates of the crushed compact disc;

c) filtering the plastic base plates and the stripping solution, thereby separating the plastic base plates from the stripping solution containing the metal;

d) recovering the metal;
 (1) passing the stripping solution containing the metal through an absorbing agent, to perform an ion exchanging reaction, so that the metal is attached to a surface of the resin;
 (2) adding a regenerating agent into the combined stripping solution ion exchange resin, so that the metal ion is detached from the absorbing agent, thereby regenerating the absorbing agent, so that the absorbing agent may be recovered and reused;
 (3) placing the stripping solution into a plating bath, to perform a plating process, so that the metal is attached to a negative electrode of the plating bath to be recovered; and e) recovering the plastic base plates.

At the sub-step (1) of the step (d), the absorbing agent may function as a filter, whereby clean water may be separated from the stripping solution, so that the clean water may be recovered and reused.

The step (d) further includes the steps of:
(4) collecting and melting the metal attached to the negative electrode of the plating bath into a melted metal;
(5) forming the melted metal into an ingot; and
(6) forming the ingot into a metal block.

The step (e) further includes the steps of:
(1) cleaning the plastic base plates that have been carried away from the stripping solution by clean water;

(2) drying the plastic base plates that have been cleaned;
(3) twisting the plastic base plates that have been dried into multiple particles, thereby forming the particle-shaped plastic material.

After the sub-step (1) of the step (e), during a rinsing process of the plastic base plates, a residue metal on surfaces of the plastic base plates is dissolved into a water solution, and the water solution containing the residue metal is then poured into the absorbing agent.

Further benefits and advantages of the present invention will become apparent after a careful reading of the detailed description with appropriate reference to the accompanying drawings.

DETAILED DESCRIPTION OF THE INVENTION

Figure 1:
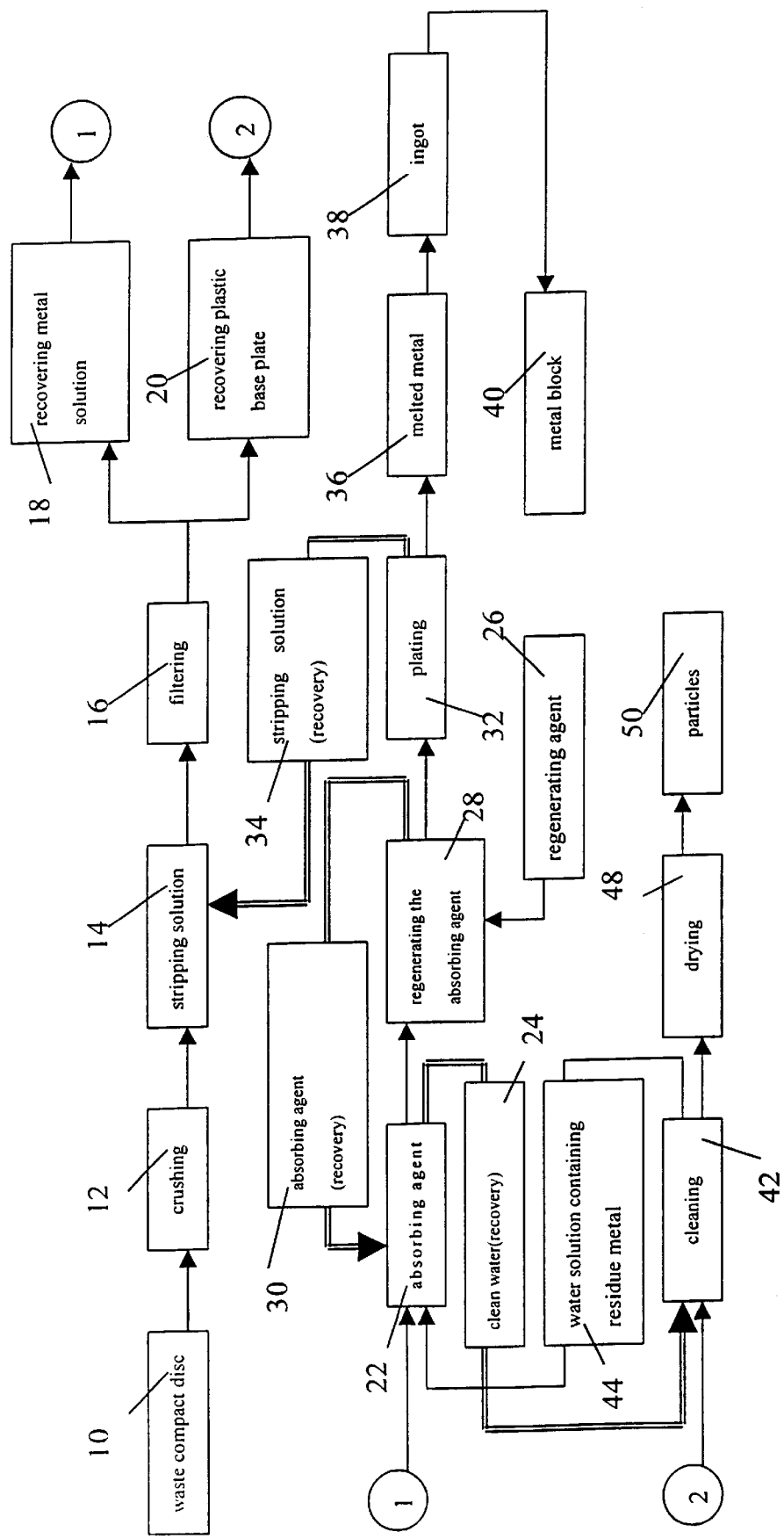
FIG. 1 is a flow chart of a recovery method of a compact disc in accordance with the present invention.

Referring to FIG. 1, a recovery method of a compact disc in accordance with the present invention may be used to recover a waste compact disc (C.D.) and comprises the following steps.

First of all, the waste compact disc (as indicated by numeral 10) may be placed into a crushing machine so that the compact disc may be crushed (as indicated by numeral 12) into multiple pieces.

Then, the multiple pieces of the crushed compact disc may be placed into a stripping solution (as indicated by numeral 14) that is mixed by cyanogen, catalyst, and water, thereby stripping the multiple pieces of the crushed compact disc, so that the metallic layer is separated from the plastic base plates of the crushed compact disc. Thus, the metal of the crushed compact disc is dissolved in the stripping solution, and the plastic base plates of the crushed compact disc float on the upper portion of the crushing machine due to its smaller density.

Then, the plastic base plates and the stripping solution are filtered (as indicated by numeral 16) by a filtering net, thereby separating the plastic base plates from the stripping solution containing the metal. Thus, the metal solution (as indicated by numeral 18) and the plastic base plates (as indicated by numeral 20) may be further processed by steps which will be further described in detail later.

Then, the plastic base plates separated from the metal are carried away. The stripping solution containing the metal then passes through an absorbing agent (as indicated by numeral 22) made of resin, to perform an ion exchanging reaction, so that the metal ions are attached to the surface of the resin.

At the same time, the absorbing agent made of resin may function so that clean water may be separated from the stripping solution. Thus, the clean water may be recovered and reused (as indicated by numeral 24).

Then, a regenerating agent of a negative ion may be added (as indicated by numeral 26) into the stripping solution containing the absorbing agent made of resin, so that the metal ions are detached from the absorbing agent made of resin, thereby regenerating the absorbing agent made of resin (as indicated by numeral 28), so that the absorbing agent made of resin may be recovered and reused (as indicated by numeral 30).

Then, the stripping solution containing the metal ions that have been detached from the absorbing agent made of resin may be laced into a plating bath, to perform a plating process (as indicated by numeral 32), so that the metal is attached to the negative electrode of the plating bath. At the same time, the stripping solution may be recovered and reused (as indicated by numeral 34).

Then, the metal attached to the negative electrode of the plating bath may be collected and melted into a molten metal (as indicated by numeral 36).

Then, the molten metal may be formed into an ingot (as indicated by numeral 38).

Then, the ingot is formed into a metal block (as indicated by numeral 40).

Then, the plastic base plates that have been carried away from the stripping solution may be cleaned (as indicated by numeral 42) by the clean water.

At the same time, during the rinsing process of the plastic base plates, the residue metal on the surfaces of the plastic base plates will be dissolved into the water solution. Then, the water solution containing the residue metal (as indicated by numeral 44) may be poured into the absorbing agent made of resin (as indicated by numeral 22), so as to perform the ion exchanging reaction, so that the metal ions are attached to the surface of the resin. The metal then can be further processed in a similar manner to that described above.

Then, the plastic base plates that have been cleaned may be dried (as indicated by numeral 48).

Then, the plastic base plates that have been dried may be twisted into multiple particles (as indicated by numeral 50), thereby forming the particle-shaped plastic material.

Accordingly, the recovery method of a compact disc in accordance with the present invention has the following advantages.

The absorbing agent, the stripping solution, and the clean water may be recovered and reused cyclically, thereby preventing consumption of the resource, preventing causing environmental pollution, and greatly decreasing the cost of fabrication.

The metal and the plastic base plates may be recovered and reused, so that the metal is not wasted directly, thereby satisfying the requirements of the environmental protection, and thereby satisfying the requirements of the recovery of the resource.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A recovery method of a compact disc, comprising the steps of:
    a) crushing a compact disc into multiple pieces;
    b) placing said multiple pieces of said crushed compact disc into a stripping solution, thereby stripping said multiple pieces of said crushed compact disc, so that a metallic layer of said crushed compact disc is separated front plastic base plates of said crushed compact disc and dissolved in said stripping solution;
    c) filtering said plastic base plates and said stripping solution, thereby separating said plastic base plates from said stripping solution containing said dissolved metal;
    d) recovering said metal, said step of recovering said metal including the steps of:
        (1) passing said stripping solution containing said dissolved metal through an absorbing agent resin to perform an ion exchanging reaction, so that metal ions are attached to a surface of said absorbing agent resin;
        (2) adding a regenerating agent into said absorbing agent resin so that said metal ions are detached from said absorbing agent resin, thereby regenerating said absorbing agent resin, said absorbing agent resin being recovered and reused;
        (3) adding said metal ions into a plating bath, to perform a plating process, so that said metal is attached to a negative electrode of said plating bath to be recovered; and
    e) recovering said plastic base plates.

2. The recovery method of a compact disc in accordance with claim 1, wherein said stripping solution is a mixture including cyanogen, a catalyst, and water.

3. The recovery method of a compact disc in accordance with claim 1, wherein said regenerating agent includes negative ions.

4. The recovery method of a compact disc in accordance with claim 1, wherein of adding a regenerating agent is followed by the step of recovering said stripping solution for reuse in step (b).

5. The recovery method of a compact disc in accordance with claim 1, wherein said step of cleaning said filtered plastic base plates includes the stop of dissolving a residue metal on surfaces of said filtered plastic base plates into a water solution, and said step of passing said stripping solution containing said metal through an absorbing agent resin includes the step of passing said water solution containing said dissolved residue metal through said absorbing agent.

\* \* \* \* \*